July 30, 1963    J. K. GILES ET AL    3,099,248
METHODS OF TRAINING HORSES
Filed Jan. 25, 1962
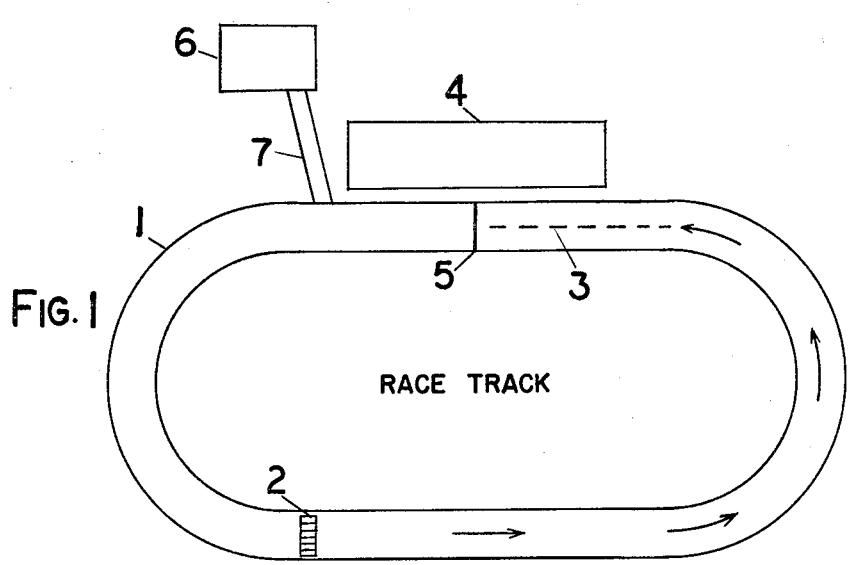
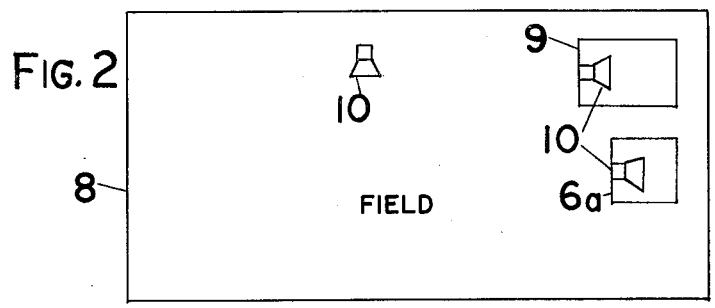
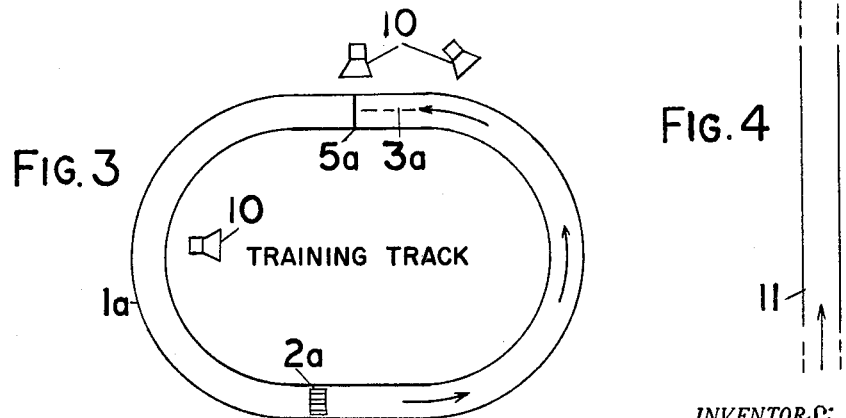
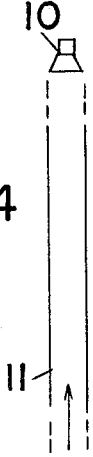
INVENTORS:
John K. Giles
Elliott W. Michener

United States Patent Office 3,099,248
Patented July 30, 1963

3,099,248
METHODS OF TRAINING HORSES
John K. Giles and Elliott W. Michener, Los Angeles, Calif., assignors of one-third to Robert A. Nash, Sierra Madre, Calif.
Filed Jan. 25, 1962, Ser. No. 168,837
2 Claims. (Cl. 119—29)

This invention relates to improvements in the art of breaking and training horses, and more specifically to pre-conditioning race horses during their growth, development and training to the disturbing sounds they will later hear during the running of races and which when heard tend to reduce their efficiency as racers.

At present young race horses are generally brought to their first races unprepared for the sudden change from an environment of quiet to the clamor of a public race track. Consequently they may be nervous and frightened by crowd noise in the saddling paddock and as they are being ridden near the grandstand. They may become dazed or intractable in the starting gate and by the time the race starts they may be in a state of nervous exhaustion. During the running of the race as they near the finish line a roar from the grandstand may cause them to slacken speed suddenly or bolt from the race track, causing injury or death to themselves or their riders. Also, a shock of fright or excitement during a young horse's first race caused by an uproar of sound to which it is not accustomed may cause in it a lasting psychological trauma, a neurosis, or by associative influence be a source of motor inhibitions that permanently impair its racing ability.

In our improvement in the art of training we forestall the foregoing ill effects by habituating horses in advance to the disturbing sounds they will afterward hear on the race track. To achieve this aim we record by conventional means, not a part of this invention, the sounds made by spectator crowds during the running of races and sounds and noise similar thereto and reproduce them through variable amplifiers, preferably electrical or electronic, within the hearing of young horses in fields, enclosures, or riding tracks. When by this means foals are being conditioned to race-track and similar noise, playbacks of the recordings are at first limited to two or three a day with the sound volume kept low as not to disturb or frighten the young animals. Later, as foals grow toward the weanling stage, frequency of reproduction and volume of sound are gradually increased. Fairly loud playbacks are made whenever more mature horses are being broken to bridle or saddle, being ridden on tracks during training, or being schooled in saddling paddock or starting gate. Through this regimen young horses may reach racing age thoroughly conditioned to racetrack noise and psychologically and neurally undamaged thereby.

In order to show more clearly the nature of this invention, reference is made to the accompanying drawing in which of FIG. 1 the numeral 1 refers to a conventional race track on which horse races may be run from a starting gate 2 counter-clockwise as indicated by arrows through the stretch 3, before the grandstand 4 in which spectators are seated and in which are housed suitable recording and reproducing means, and across the finish line 5, and 6 is a paddock in which horses are saddled before races and brought onto the track 1 by the roadway 7, where they may be paraded past the grandstand 4 and around to the starting gate 2; of FIG. 2 the numeral 8 refers to an enclosed field in which horses may be kept during both growth and maturity, 9 is a stable enclosure for horses, and 6a is a paddock in which horses may be broken to saddle and to riding, with numerals 10 referring to loud-speaker horns through which race-track sounds may be reproduced within the hearing of horses; of FIG. 3 the numeral 1a refers to a training track on which race horses may be trained in trial runs from a starting gate 2a in the direction indicated by arrows through a stretch 3a across a finish line 5a, and the numerals 10 to loud-speaker horns through which race-track noise may be reproduced in the hearing of horses on the track; and of FIG. 4 the numeral 10 refers to a loud-speaker horn and 11 to a roadway on which horses may be exercised and trained.

A further advantage is also achieved through our improvements. On each occasion when horses are being worked in trial runs in preparation for their first race, playbacks of the recordings aforesaid are made with the sound volume climatically increasing as the run progresses and reaching a maximum near the finish. Thus by associating their moments of greatest speed with a maximum of race-track noise, desirable reflexes are conditioned in the horses. At the climax of a race the sudden roaring of the grandstand spectators, instead of alarming or inhibiting horses as has been usual, may stimulate in them an unrestrained burst of energy when it is most needed.

What is claimed:

1. In a method of breaking and training horses preparatory to racing, the recording of sounds and noise heard at public race tracks during the running of races thereat and sounds and noise similar thereto and the reproduction of such sounds and noise by mechanical and electrical means positioned within the hearing of race horses within and in the vicinity of fields, enclosures, stables, roadways and riding tracks where the horses are kept and trained, with the loudness of such reproduction gradually varied and increased upon repetition so as not to startle the horses, for the purpose of accustoming them to exciting and alarming sounds associated with racing and hardening them thereto, thereby making the horses less excitable, more tractable and neurally stronger before and during the running of races.

2. In the method of training horses of claim 1 the recording of vocal sounds and noise made by spectators at race tracks during the running of horse races and similar sounds and noise and the reproduction of such sounds and noise in varied volume by means of mechanical and electrical sound reproducers of variable output positioned on, in, and within audible range of roadways and riding tracks where horses are being trained in practice runs in preparation for racing, with the sound volume increased near the finish of the runs for the purpose of establishing in horses by association of auditory stimuli and efficient exertion a reflex tendency of response to the cries of spectator crowds characterized by increased speed in running.

References Cited in the file of this patent

UNITED STATES PATENTS

| | | |
|---|---|---|
| 2,794,576 | Reynolds | June 4, 1957 |
| 2,851,991 | Rinck | Sept. 16, 1958 |

OTHER REFERENCES

Washington Times-Herald Newspaper, June 1, 1941, Magazine section, page 4.